United States Patent
Van Laar et al.

(10) Patent No.: US 10,493,646 B2
(45) Date of Patent: Dec. 3, 2019

(54) CUTTING STATION FOR A TIRE BUILDING MACHINE

(71) Applicant: VMI HOLLAND B.V., Epe (NL)

(72) Inventors: Gerardus Johannes Catharina Van Laar, Epe (NL); Pieter Cornelis Meijers, Epe (NL)

(73) Assignee: VMI HOLLAND B.V. (NL)

( * ) Notice: Subject to any disclaimer, the term of this patent is extended or adjusted under 35 U.S.C. 154(b) by 0 days.

(21) Appl. No.: 15/556,080

(22) PCT Filed: Feb. 3, 2016

(86) PCT No.: PCT/NL2016/050075
§ 371 (c)(1),
(2) Date: Sep. 6, 2017

(87) PCT Pub. No.: WO2016/159759
PCT Pub. Date: Oct. 6, 2016

(65) Prior Publication Data
US 2018/0264670 A1      Sep. 20, 2018

(30) Foreign Application Priority Data
Mar. 30, 2015   (NL) .................................. 2014552

(51) Int. Cl.
*B26D 1/20* (2006.01)
*B26D 3/00* (2006.01)
(Continued)

(52) U.S. Cl.
CPC ............ *B26D 1/205* (2013.01); *B26D 3/003* (2013.01); *B26D 7/025* (2013.01); *B26D 7/2635* (2013.01);
(Continued)

(58) Field of Classification Search
CPC ..... B29D 30/46; B29D 30/463; B29D 30/466
(Continued)

(56) References Cited

U.S. PATENT DOCUMENTS 1,419,907 A * 6/1922 Worthington .......... B29D 30/46
83/111
1,506,428 A * 8/1924 Iredell .................... B29D 30/46
242/528
(Continued)

FOREIGN PATENT DOCUMENTS

| | | | |
|---|---|---|---|
| CN | 104379332 | 2/2015 | ............. B29D 30/46 |
| EP | 1065043 | 1/2001 | ............. B29D 30/46 |

(Continued)

OTHER PUBLICATIONS

International Search Report and Written Opinion issued in application No. PCT/NL2016/050075, dated May 13, 2016 (12 pgs).
(Continued)

*Primary Examiner* — Kenneth E Peterson
(74) *Attorney, Agent, or Firm* — Hayes Soloway P.C.

(57) ABSTRACT

A cutting station for a tire building machine includes a cutting device and a feeding device for feeding a strip of rubber material into the cutting device. The cutting device includes a cutting table for supporting the strip of rubber material in a support plane (P) and a cutting element for cutting the strip of rubber material along a cutting line (C) that extends parallel to the support plane (P), wherein the support plane (P) extends at a support angle (B) with respect to a first vertical plane in a range of five to thirty degrees and wherein the feeding device (5) is arranged for feeding the strip of rubber material onto the cutting table in a downward feeding direction parallel to the support plane. Also provided is a tire building machine incorporating the cutting station and a cutting method.

25 Claims, 4 Drawing Sheets

(51) Int. Cl.
  *B26D 7/02* (2006.01)
  *B26D 7/26* (2006.01)
  *B29D 30/00* (2006.01)
  *B65H 35/00* (2006.01)

(52) U.S. Cl.
  CPC ..... *B29D 30/0016* (2013.01); *B65H 35/0086* (2013.01); *B26D 2007/2685* (2013.01); *B26D 2007/2692* (2013.01); *B65H 2801/93* (2013.01)

(58) Field of Classification Search
  USPC .......................................................... 83/951
  See application file for complete search history.

(56) References Cited

U.S. PATENT DOCUMENTS

| | | | | |
|---|---|---|---|---|
| 1,610,818 A * | 12/1926 | Spadone | ................ | B29D 30/46 226/95 |
| 1,691,605 A * | 11/1928 | Hennessy | ............. | B29D 30/46 83/880 |
| 1,732,704 A * | 10/1929 | Wegner | ................... | B26D 7/01 226/123 |
| 1,737,146 A * | 11/1929 | Castricum | ............. | B29D 30/46 83/353 |
| 1,745,127 A * | 1/1930 | Stevens | ................. | B29D 30/46 242/526.1 |
| 1,746,119 A | 2/1930 | Koleta | | |
| 1,799,620 A * | 4/1931 | Putt | ........................ | B29D 30/46 29/2.1 |
| 2,238,303 A * | 4/1941 | Beitman | ................ | B29D 30/46 83/282 |
| 2,551,762 A * | 5/1951 | Pfeiffer | ................. | B29D 30/46 83/363 |
| 2,754,953 A * | 7/1956 | Groncy | ................. | B29D 30/46 198/403 |
| 2,962,083 A * | 11/1960 | Hasselquist | ............ | B29D 30/38 156/512 |
| 2,979,978 A * | 4/1961 | Hasselquist | ............ | B29D 30/46 83/209 |
| 3,008,498 A * | 11/1961 | Olson | .................. | B23D 47/025 144/242.1 |
| 3,019,018 A * | 1/1962 | Hasselquist | ............ | B29D 30/46 198/412 |
| 3,672,249 A | 6/1972 | Sasaki | ............... | 83/80 |
| 3,815,804 A * | 6/1974 | Aka | ....................... | B29D 30/46 226/196.1 |
| 4,858,505 A * | 8/1989 | Still | ....................... | B29D 30/46 83/49 |
| 5,145,542 A * | 9/1992 | Tanaka | .................. | B29D 30/42 156/159 |
| 6,346,163 B1 * | 2/2002 | Mizota | .................. | B29D 30/38 156/264 |
| 6,612,792 B2 * | 9/2003 | Barclay | ............. | B23Q 11/0017 144/286.1 |
| 9,855,716 B2 | 1/2018 | Deboeuf, Jr. et al. | ....................... | B29D 30/3042 |
| 2002/0002888 A1 * | 1/2002 | Essinger | ................. | B21F 11/00 83/13 |
| 2006/0070504 A1 * | 4/2006 | Downing | ............... | B26D 1/045 83/451 |

FOREIGN PATENT DOCUMENTS

| | | | | |
|---|---|---|---|---|
| JP | 4637890 | 11/1971 | | |
| JP | S59209845 | 11/1984 | ............ | B29C 67/00 |
| JP | 2001009929 | 1/2001 | ............ | B29D 30/42 |
| JP | 2010017927 | 1/2010 | ............ | B29D 30/38 |
| JP | 2013107285 | 6/2013 | ............ | B29D 30/38 |
| SU | 1112689 | 9/1994 | ............ | B29D 30/26 |
| WO | WO2008123772 | 10/2008 | ............... | B26D 1/20 |
| WO | WO2010004869 | 1/2010 | ............ | B29D 30/38 |
| WO | WO2013077201 | 5/2013 | ............ | B29D 30/38 |

OTHER PUBLICATIONS

Notification of Reason for Refusal of Korean Patent Application Serial No. 10-2016-7020498, dated May 23, 2017 ( 2 pages).
Decision to Grant Korean Patent Application Serial No. 10-2016-7020498, dated Nov. 30, 2017 with translation (3 pages).
Written Opinion of Korean Patent Application Serial No. 10-2016-7020498, dated Jul. 21, 2017 (3 pages).
Japanese Notice of Rejection (w/translation) issued in application No. 2017-550124, dated Mar. 13, 2018 (4 pgs).
Chinese Office Action issued (w/translation) in application No. 2016800192352, dated Feb. 28, 2019 (3 pgs).
Russian Decision to Grant (w/machine translation) issued in application No. 2017135369, dated Jun. 4, 2019 (4 pgs).

* cited by examiner

CUTTING STATION FOR A TIRE BUILDING MACHINE

BACKGROUND

The invention relates to a cutting station for a tire building machine.

WO 2008/123772 A1 discloses a cutting device for cutting strips from a band of material. The cutting device comprises an upper knife and a lower knife, wherein the upper knife can be swiveled upwards to allow for a transfer device in the form of a magnet beam to pass underneath. The magnet beam is arranged to pick up and retain the band of material on a feed conveyor at one side of the knives and for transferring the band of material onto a discharge conveyor at an opposite side of the knives, while crossing a cutting line. The magnet beam subsequently releases the band of material onto the discharge conveyor and moves away, while the upper knife is swiveled back into abutting contact with the lower knife to cut the transferred band of material along the cutting line.

The passing of the transfer device across the cutting line requires that the upper knife moves away sufficiently to avoid contact between the transfer device and the upper knife, thereby rendering the cutting device less compact. Also, the mechanism to move the upper knife away makes the cutting device unnecessarily complex, more costly and subject to more maintenance. Furthermore, the upper knife can only move back into a position for cutting after the transfer device has cleared the cutting line. This costs valuable time in the process of tire manufacturing.

U.S. Pat. No. 1,746,119 A discloses a tire fabric cutting and band building machine. The machine includes a table carried in a vertical position on a main frame. A sheet of fabric passes downwardly from an upper roller along the table to a knife moving diagonally with reference to the table. Although this machine partly solves the problem of the cutting device according to WO 2008/123772 A1, its solution is not satisfactory as the sheet of fabric is unsupported and/or unguided when passing downwardly from the upper roller along the table towards the knife. Hence, the position of the sheet at the knife is unknown and may be inaccurate.

It is an object of the present invention to provide a cutting station for a tire building machine, wherein at least one of the aforementioned drawbacks can at least partially be resolved.

SUMMARY OF THE INVENTION

According to a first aspect, the invention provides a cutting station for a tire building machine, wherein the cutting station comprises a cutting device and a feeding device for feeding a strip of rubber material into the cutting device, wherein the cutting device comprises a cutting table for supporting the strip of rubber material in a support plane and a cutting element for cutting the strip of rubber material along a cutting line that extends parallel to the support plane, wherein the support plane extends at a support angle with respect to a first vertical plane in a range of five to thirty degrees and wherein the feeding device is arranged for feeding the strip of rubber material onto the cutting table in a downward feeding direction parallel to the support plane.

The aforementioned range for the support angle can facilitate sliding of the rubber tire component in the downward feeding direction over the cutting table at least partially under the influence of gravity, so that the prior art positioning means, such as magnet beams, arms or the like, that would normally intersect with the cutting line during the positioning of the strip of rubber material, and that would thus interfere with the subsequent cutting of said strip of rubber material, are no longer required. Thus, the cutting operation can commence immediately after the required length of strip of rubber material has been fed onto the cutting table in the feeding direction, without having to wait for the prior art positioning means to move out of the way.

Unlike U.S. Pat. No. 1,746,119 A, the strip of rubber material can be supported by the obliquely oriented support plane during the feeding of the strip of rubber material in the downward feeding direction, thereby improving the accuracy of the positioning of said strip of rubber material.

In an embodiment the support angle is arranged to facilitate sliding of the strip of rubber material in the downward feeding direction over the cutting table at least partially under the influence of gravity. Sliding over an obliquely oriented support plane is preferred over the unguided dropping along the vertical table of U.S. Pat. No. 1,746,119 A. In particular, sliding is a more controlled and accurate way of feeding the strip of rubber material in the downward feeding direction over the obliquely oriented cutting table.

In an embodiment the support angle is in a range of ten to twenty degrees. This smaller range can increase the effect of gravity on the strip of rubber material, thereby reducing the amount of friction between the strip of rubber material and the cutting table and increasing the ability of strip of rubber material to slide over the cutting table under the influence of gravity.

In an embodiment the feeding direction extends parallel to or substantially parallel to a second vertical plane that extends perpendicular to the first vertical plane. The strip of rubber material can thus be fed in or parallel to the second vertical plane, which is the same vertical plane in which gravity acts on the strip of rubber material. This can reduce or eliminate sideways components of gravity acting on the strip of rubber material. The strip of rubber material can thus automatically be aligned in the feeding direction under the influence of gravity, without the need of further guiding means.

In an embodiment the cutting line extends obliquely with respect to the second vertical plane. This allows for the strip of rubber material to be cut into tire components having a characteristic parallelogram or rhomboid contour or shape.

In an embodiment the feeding direction intersects with the cutting line. The rubber tire component can thus be fed in the feeding direction across the cutting line under the influence of gravity.

In an embodiment the feeding device is arranged for feeding the strip of rubber material onto the cutting table into a cutting position in which the strip of rubber material extends beyond the cutting line in the downward feeding direction. The rubber tire component can thus be fed in the feeding direction across and/or beyond the cutting line under the influence of gravity.

In an embodiment the feeding device during feeding does not intersect with the cutting line. Again, the advantage of the cutting device according to the invention is that the feeding device can be kept free from the cutting line to allow immediate or faster cutting after the strip of rubber material has been fed in the feeding direction into a cutting position under the influence of gravity.

In an embodiment the cutting device comprises a cutting guide extending parallel to the cutting line, wherein the cutting element is movable along the cutting guide to cut the strip of rubber material at the cutting line, wherein the cutting guide is spaced apart along the cutting line from the cutting table by a feeding gap, wherein the feeding device is arranged for feeding the strip of rubber material in the feeding direction through the feeding gap. The tire component can be fed in the feeding direction through the feeding gap without the prior art positioning means interfering with the feeding gap and the cutting line at the feeding gap. The feeding gap can thus be designed to be considerably smaller than the feeding gap required to allow the passage underneath of the prior art positioning means. In fact, the height of the feeding gap in a direction perpendicular to the support plane can be as small as or only marginally larger than the thickness of the strip of rubber material in the same direction.

In an embodiment the cutting line extends at a cutting angle, wherein the cutting guide is rotatable with respect to the feeding device about a rotational axis that extends orthogonal to the support plane to adjust the cutting angle. Thus, the obliqueness of the parallelogram of rhomboid shape of the tire components can be adjusted and/or controlled.

In an embodiment the cutting table is rotatable about the rotational axis, wherein the cutting guide is operationally coupled to cutting table so as to be rotatable together with the cutting table about the rotational axis. This can simplify the structural design of the cutting device, as the cutting table, the cutting guide and the associated cutting element can all be moved together by a single rotational drive.

In an embodiment the cutting table has an at least partly circular outer edge extending concentrically to the axis of rotation. The radial distance or shape with respect to the feeding device can be kept constant or made independent from the angular position of the cutting table with respect to the rotational axis.

In an embodiment the cutting station comprises a base for rotatable supporting the cutting table, wherein the cutting station is further provided with a rotational drive that is coupled to the cutting table to rotate the cutting table about the rotational axis with respect to the base. This single rotational drive can thus drive the rotation of the cutting table, as well as the rotation of cutting guide and the associated cutting element.

In an embodiment the cutting element is a disc cutter, wherein the cutting table is provided with a cutting bar that cooperates with the disc cutter to cut the strip of rubber material at the cutting line. Such a cutter configuration is known as a 'disc and bar' type cutter and can be effectively used to cut-off tire components from the strip of rubber material.

According to a second aspect, the invention provides a tire building machine comprising the aforementioned cutting station for cutting off a first tire component from the strip of rubber material, wherein the first tire component has a main surface that directly after cutting extends parallel to the support plane, wherein the tire building machine is further provided with a first conveyor for conveying the first tire component from the cutting station towards a downstream station or a tire building drum in a first plane of conveyance different from the support plane, wherein the tire building machine comprises a first transfer unit for transferring the first tire component from the cutting station to the first conveyor while repositioning the first tire component from a first orientation to a second orientation, respectively, wherein the main surface of the first tire component in the first orientation extends parallel to the support plane and in the second orientation extends parallel to the first plane of conveyance.

The first transfer unit can thus be used to reorient or reposition the first tire component from the relative steep first orientation to a second orientation which is typically horizontal or substantially horizontal.

In an embodiment the first transfer unit comprises a first gripper for engaging the first tire component at the support plane during or directly after cutting and for repositioning the first tire component from the first orientation into the second orientation. The engagement of first tire component by the first gripper can prevent that the first tire component falls down from the cutting table under the influence of gravity after cutting.

In an embodiment the first transfer unit comprises a first manipulator, preferably in the form of a robot having six degrees of freedom, wherein the first manipulator is arranged for moving the first gripper from the first orientation into the second orientation. The first manipulator can thus move the first gripper and the first tire component engaged thereon in three dimensions, to allow for the relative complex transfer from the steep first orientation to the second, preferably horizontal orientation.

In an embodiment the cutting station is arranged for alternatingly cutting off the first tire component and a second tire component from the strip of rubber material, wherein the second tire component has a main surface that directly after cutting extends parallel to the support plane, wherein the tire building machine is further provided with a second conveyor for conveying the second tire component from the cutting station towards a downstream station or a tire building drum in a second plane of conveyance different from the support plane, wherein the tire building machine comprises a second transfer unit for transferring the second tire component from the cutting station to the second conveyor while repositioning the second tire component from a third orientation to a fourth orientation, respectively, wherein the main surface of the second tire component in the third orientation extends parallel to the support plane and in the fourth orientation extends parallel to the second plane of conveyance. The second transfer unit can thus be used to reorient or reposition the second tire component from the relative steep third orientation to a fourth orientation which is typically horizontal or substantially horizontal.

In an embodiment the second transfer unit comprises a second gripper for engaging the second tire component at the support plane during or directly after cutting and for repositioning the second tire component from the third orientation into the fourth orientation. The engagement of second tire component by the second gripper can prevent that the second tire component falls down from the cutting table under the influence of gravity after cutting.

In an embodiment the second transfer unit comprises a second manipulator, preferably in the form of a robot having six degrees of freedom, wherein the second manipulator is arranged for moving the second gripper from the third orientation into the fourth orientation. The second manipulator can thus move the second gripper and the second tire component engaged thereon in three dimensions, to allow for the relative complex transfer from the steep third orientation to the fourth, preferably horizontal orientation.

According to a third aspect, the invention provides a method for cutting off a first tire component from a strip of rubber material in the aforementioned cutting station, wherein the method comprises the step of feeding the strip of rubber material onto the cutting table in the downward feeding direction parallel and allowing the strip of rubber material to slide in the downward feeding direction under the influence of gravity over the cutting table into a cutting position in which the strip of rubber material extends beyond the cutting line in the downward feeding direction. The method has the same advantages has the aforementioned cutting station, which advantages are not repeated hereafter for reasons of conciseness.

In an embodiment the first tire component has a main surface that directly after cutting extends parallel to the support plane, wherein the tire building machine is further provided with a first conveyor for conveying the first tire component from the cutting station towards a downstream station or a tire building drum in a first plane of conveyance different from the support plane, wherein the method further comprises the step of transferring the first tire component from the cutting station to the first conveyor while repositioning the first tire component from a first orientation to a second orientation, respectively, wherein the main surface of the first tire component in the first orientation extends parallel to the support plane and in the second orientation extends parallel to the first plane of conveyance.

In an embodiment the first plane of conveyance is horizontal or substantially horizontal.

In an embodiment the cutting station is arranged for alternatingly cutting off the first tire component and a second tire component from the strip of rubber material, wherein the second tire component has a main surface that directly after cutting extends parallel to the support plane, wherein the tire building machine is further provided with a second conveyor for conveying the second tire component from the cutting station towards a downstream station or a tire building drum in a second plane of conveyance different from the support plane, wherein the method further comprises the step of transferring the second tire component from the cutting station to the second conveyor while repositioning the second tire component from a third orientation to a fourth orientation, respectively, wherein the main surface of the second tire component in the third orientation extends parallel to the support plane and in the fourth orientation extends parallel to the second plane of conveyance.

In an embodiment the second plane of conveyance is horizontal or substantially horizontal.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

Figure 1:
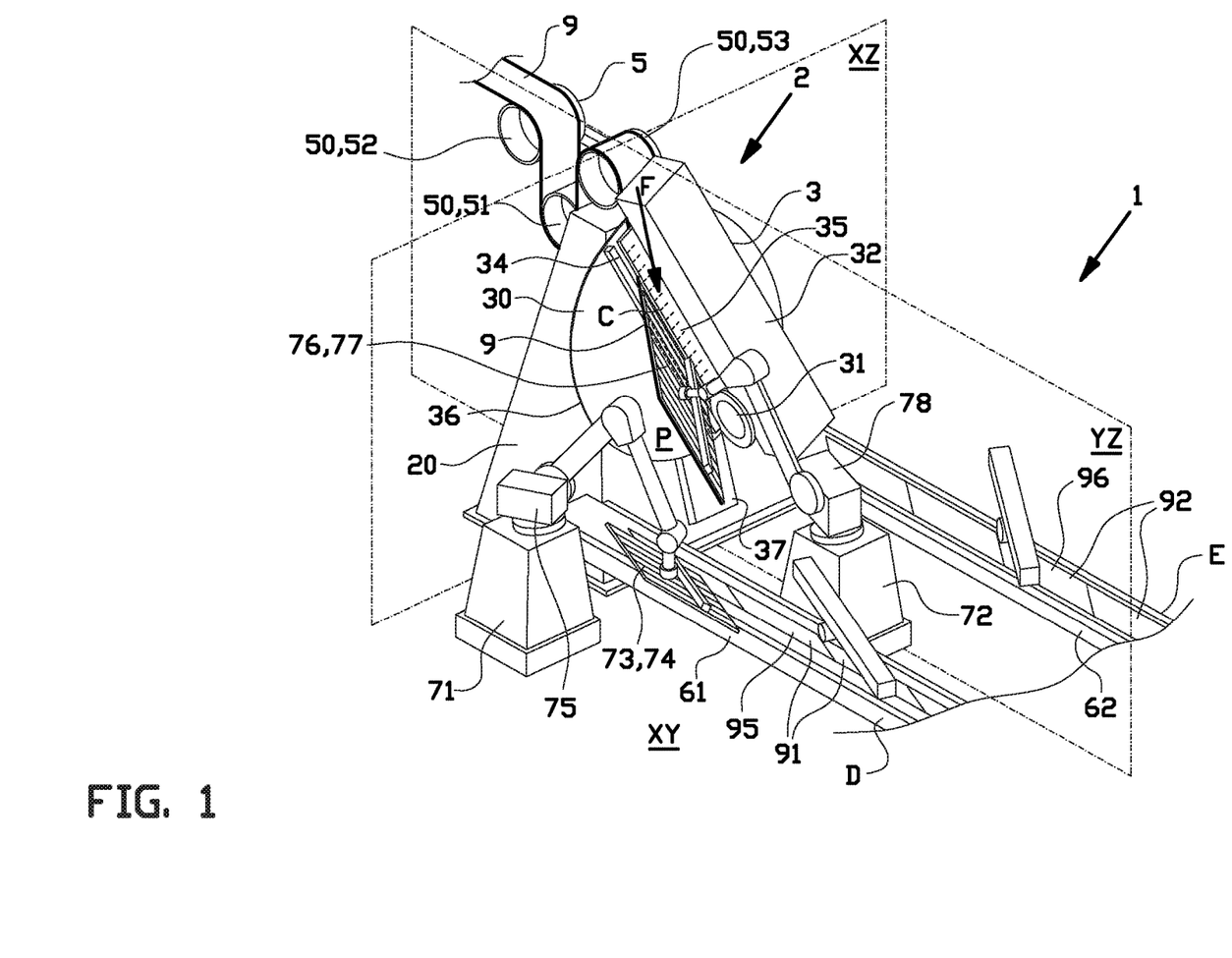
FIG. 1 shows an isometric view of a tire building machine comprising a cutting station according to the invention.

FIG. 1 shows a tire building machine 1, according to the invention. The tire building machine 1 is arranged for manufacturing belts or belt mats, in particular body plies or breaker plies for a tire.

The tire building machine 1 comprises a cutting station 2 with cutting device 3 for alternatingly cutting a strip of rubber material 9 into first tire components 91 and second tire components 92 and a feeding device 5 for feeding the continuous strip of rubber material 9 into the cutting device 3 from a source, for example a storage reel or an extruder (not shown). The first tire components 91 and the second tire components 92 are cut off from the continuous strip of rubber material 9 at a cutting angle A, which gives the tire components 91, 92 their characteristic parallelogram or rhomboid shape. The tire building machine 1 further comprises a first conveyor 61 and a second conveyor 62 for conveying the first tire components 91 and the second tire components 92, respectively, towards a downstream station or tire building drum (not shown). The tire building machine 1 finally comprises a first transfer unit 71 between the cutting station 2 and the first conveyor 61 for transferring the first tire components 91 from the cutting station 2 onto the first conveyor 61 and a second transfer unit 72 for transferring the second tire components 92 from the cutting station 2 onto the second conveyor 62.

Figure 2:
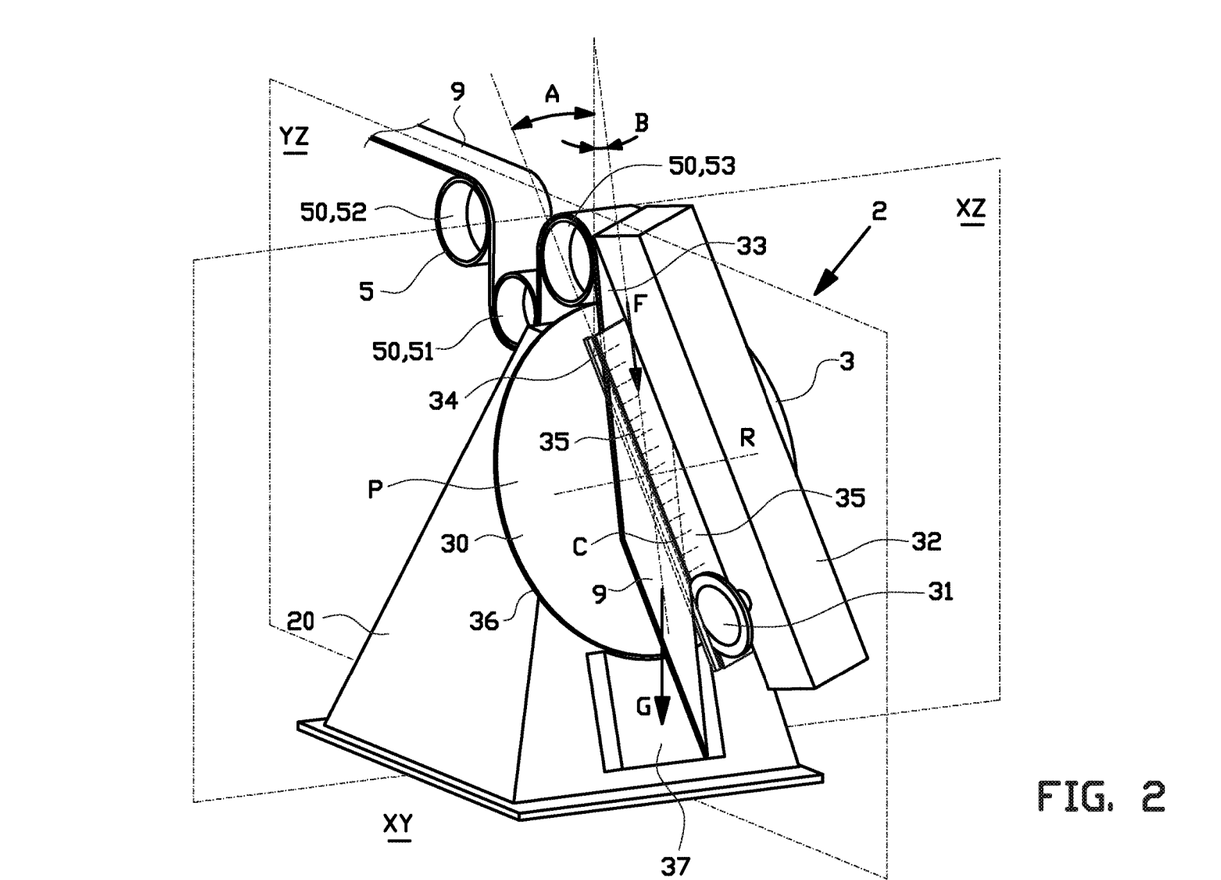
FIG. 2 shows an isometric view of the cutting station according to FIG. 1.

The cutting station 2 according to the invention will be described in more detail hereafter with reference to FIGS. 2, 3 and 4. As shown in FIG. 2, the cutting station 2 comprises a base 20 for supporting the cutting device 3 and the feeding device 5. In this exemplary embodiment, the base 20 is placed on a substantially flat, horizontal factory floor (schematically shown as horizontal plane XY) and extends substantially upright in a vertical direction with respect to the factory floor XY. For the purpose of explaining the invention, the vertical direction is defined with respect to a first or transverse vertical plane XZ and a second or longitudinal vertical plane YZ extending perpendicular to the first vertical plane XZ. The first vertical plane XZ and the second vertical plane YZ are vertical or substantially vertical, e.g. within a deviation of only a few degrees from the absolute vertical direction. The cutting device 3 comprises a cutting table 30 for supporting the strip of rubber material 9 in a support plane P. The cutting table 30 is rotatably supported on the base at a sharp, small and/or oblique support angle B with respect to the transverse vertical plane XZ such that the support plane P is oriented very steeply with respect to the horizontal factory floor XY. The support angle B is in the range of five (5) to thirty (30) degrees, and most preferably in the range of ten (10) to twenty (20) degrees. In this exemplary embodiment, the support angle B is approximately fifteen (15) degrees.

The cutting device 3 is provided with a cutting element 31, in this example in the form of a cutting disc 31, for cutting the strip of rubber material 9 along a cutting line C. The cutting device 3 comprises a cutting guide 32 that extends parallel to the cutting line C. The cutting element 9 is coupled to the cutting guide 32 so as to be movable along the cutting guide 32 and along the cutting line C. Preferably, the cutting guide 32 is provided with a linear drive (not shown) to move the cutting element 31 with respect to the cutting guide 32 along the cutting line C. The cutting guide 32 is spaced apart from the cutting table 30 along the cutting line C by a constant or substantially constant feeding gap 33. The feeding gap 33 may have a height in a direction perpendicular to the support plane P that is only marginally larger than the thickness of the strip of rubber material 9 in the same direction, e.g. less than one-hundred-and-ten (110) percent or less than one-hundred-and-fifty (150) percent of said thickness.

Opposite to the cutting guide 32 with respect to the feeding gap 33, the cutting device 3 is provided with a cutting bar 34 that extends along the cutting line C at or in the surface of the cutting table 30. The cutting element 31, in particular the cutting disc 31, is arranged to interact or cooperate with the cutting bar 34 in a manner known per se to form a so-called 'disc and bar' type cutter. The cutting disc 31 extends in a direction perpendicular to the support plane P beyond the cutting bar 34 over a cutting depth and moves along the cutting line C with respect to the cutting bar 34 to cut the strip of rubber material 9 along the cutting line C. Alternatively or additionally, the cutting table 30 may be provided with a slit for receiving the cutting disc 31 at a certain cutting depth that intersects with the surface of the cutting table 30 at the cutting line C. In this exemplary embodiment, the cutting device 3 is further provided with a hold-down plate or hold-down bar 35 extending along the cutting line C at the same side of the strip of rubber material 9 as the cutting guide 32, to hold down the strip of rubber material 9 on the cutting table 30 at or near the cutting line C.

The cutting device 3 may also comprise a 'guillotine' type cutter, in which case the cutting disc 31 is replaced by a bar-like cutting element opposite to and interacting with the cutting bar 34 in a manner known per se.

The cutting table 30 is arranged to be rotatable with respect to the base 20 about a rotational axis R perpendicular to or orthogonal to the support plane P. The cutting station 2 is provided with a rotational drive 21, preferably inside the base 20, that is operationally coupled to the cutting table 30 for rotating the cutting table 30 about the rotational axis R. The cutting guide 32 is mounted to the cutting table 30 in a rotationally fixed manner so as to rotate together with the cutting table 30 about the rotational axis R. Thus, by rotating the cutting table 30, the cutting guide 32 and the associated cutting element 31 can be rotated as a whole about the rotational axis R to adjust the cutting angle A with respect to the longitudinal vertical plane YZ. As best seen in FIG. 3, the cutting table 30 has an at least partly and in this example fully circular circumferential edge 36 extending concentrically with respect to the axis of rotation R. The cutting table 30 can thus be rotated about the axis of rotation R without interfering with other components of the cutting station 2 outside the circular circumferential edge 36 and/or while maintaining a constant radial distance to the feeding device 5. As shown in FIG. 2, the cutting station 2 comprises a stationary extension 37 extending in the support plane P flush with the cutting table 30 at the bottom of said cutting table 30 for supporting the cut leading end 93 of the strip of rubber material 9 in a situation wherein said cut leading end 93 extends beyond the circular circumferential edge 36 of the cutting table 30.

Figure 4:
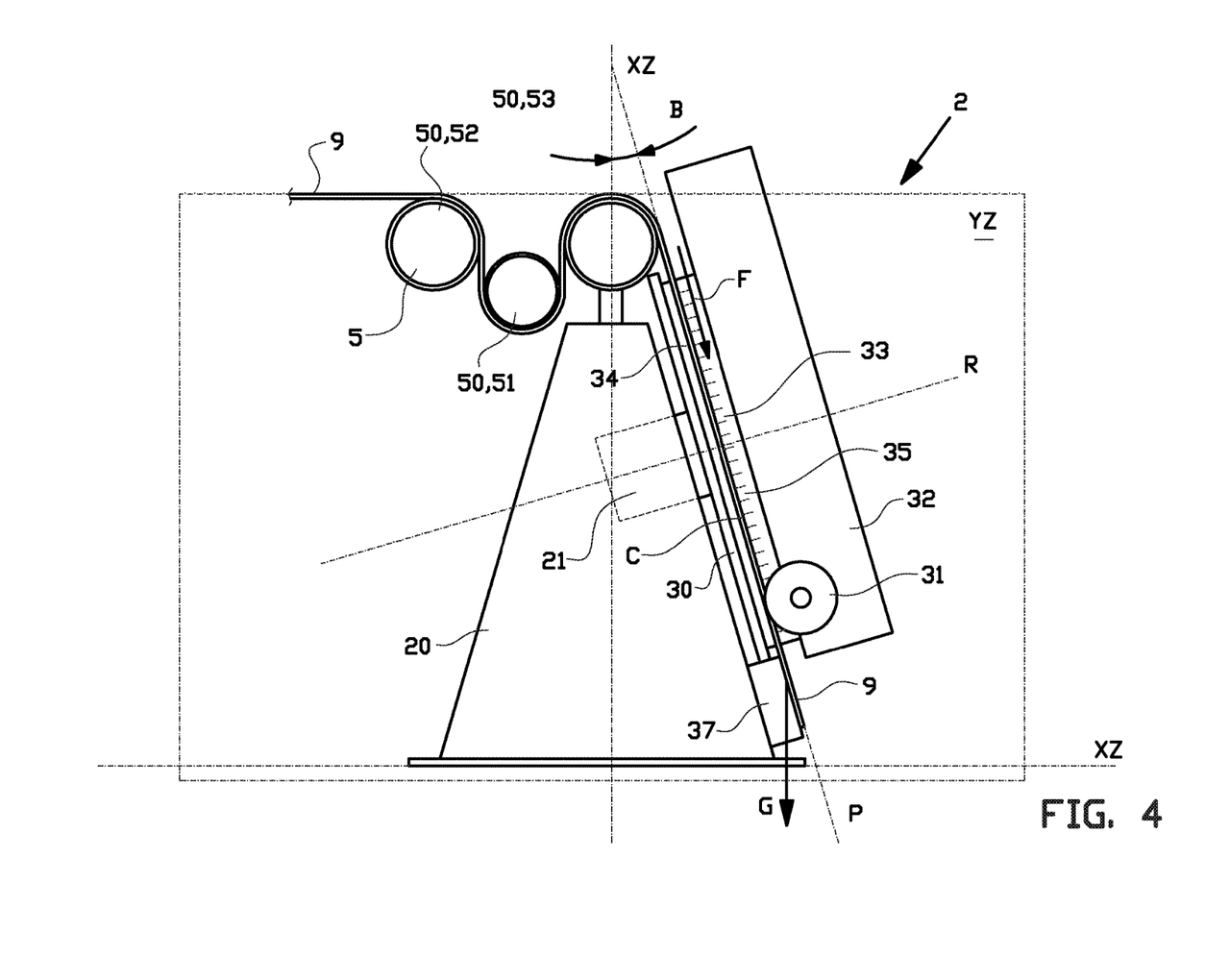
FIG. 4 shows a side view of the cutting station according to FIG. 2.

As shown in FIGS. 1, 2 and 4, the feeding device 5 is arranged upstream of the cutting device 3 and comprises a plurality of rollers 50 for guiding the strip of rubber material 9 downstream towards the cutting device 3. The plurality of rollers 50 preferably comprises a dancer roller 51 that is arranged between two stationary rollers 52, 53 to guide the continuous strip of rubber material 9 in a loop over the stationary rollers 52, 53 and underneath the dancer roller 51. The dancer roller 51 is rapidly movable in a vertical direction, parallel to the vertical planes XZ, YZ, to accumulate, collect or buffer a certain length of the continuous strip of rubber material 9, for example at a moment in time when the feeding of the strip of rubber material 9 to the cutting device 3 has to be temporarily interrupted for the cutting operation. The last of the plurality of rollers 50 in the downstream direction, just upstream of the cutting device 3, is arranged directly above the cutting table 30 for feeding the continuous strip of rubber material 9 in the feeding direction F in-line with or parallel to the support plane P onto the cutting table 30. More specifically, the feeding device 5 is arranged for feeding the continuous strip of rubber material 9 into the cutting device 3 at the top of the cutting table 30.

The feeding device 5 is arranged for feeding the strip of rubber material 9 onto the cutting table 30 of the cutting device 3 in a downward feeding direction F, parallel to or substantially parallel to the support plane P. The feeding direction F is furthermore parallel or substantially parallel to the longitudinal vertical plane YZ. As a result of the combination of the downward feeding direction F and the support angle B, the strip of rubber material 9 can be fed onto the cutting table 30 by sliding the strip of rubber material 9 over the cutting table 30 under the influence of a gravitational force, a gravitation pull or gravity G acting vertically on the strip of rubber material 9. To prevent that the length of the continuous strip of rubber material 9 upstream of the cutting table 30 counteracts the feeding under the influence of gravity G, the feeding device 3 continues to feed the continuous strip of rubber material 9 onto the cutting table 30 at the same rate or substantially the same rate as the rate at which the length of the strip of rubber material 9 on the cutting table 9 is pulled down by gravity G in the feeding direction F.

To minimize friction between the cutting table 30 and the strip of rubber material 9, the surface of the cutting table 30 may be made of a low friction material or provided with a coating of a low friction material (not shown).

Figure 3:
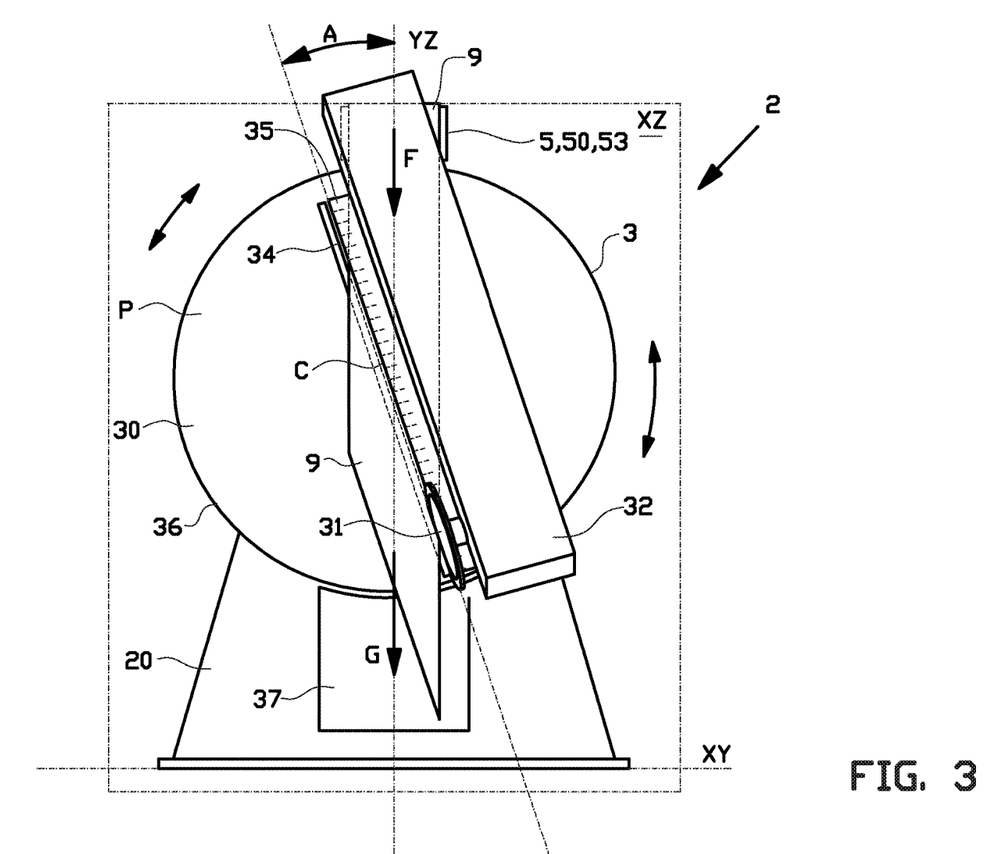
FIG. 3 shows a front view of the cutting station according to FIG. 2.

It can be observed in FIGS. 2, 3 and 4 that the feeding direction F crosses or intersects with the cutting line C at an oblique angle, equal to the cutting angle A. The feeding direction F furthermore extends through the gap between the cutting guide 32 and the cutting bar 34. Consequently, the strip of rubber material 9 can be fed by the feeding device 5 onto the cutting table 30, through said gap 33 and beyond the cutting line C into a cutting position as shown in FIGS. 2, 3 and 4 under the influence of gravity G, without the need of further prior art positioning means, such as magnet beams, arms or the like, that would normally intersect with the cutting line C during the positioning of the strip of rubber material 9 and thus interfere with the subsequent cutting of said strip of rubber material 9. In particular, it can be observed from FIG. 4 that the feeding device 5 does not extend beyond or intersect with the cutting line C during the feeding. Hence, cutting can start immediately or as soon as the strip of rubber material 9 has arrived in the cutting position as shown in FIGS. 2, 3 and 4.

The cutting station 2 as shown in FIGS. 2, 3 and 4 is arranged for manufacturing tire components 91, 92 of different form and size. In particular, the length of the cut-off tire components 91, 92 can be chosen by simply controlling the length of the continuous strip of rubber material 9 that is fed onto the cutting table 9. In fact, in this exemplary embodiment, the length is changed alternatingly between two predetermined sizes to arrive at first tire components 91 and second tire components 92 of different widths W1, W2, as shown in FIG. 1. Typically, such tire components 91, 92 are used to produce tire layers 95, 96, e.g. by stitching together the tire components 91, 92, to form breaker plies or body plies which ultimately are applied in in a tire carcass at a tire building drum (not shown). Alternatively or additionally, the cutting angle A may be adjusted during or between cutting operations, to adjust the obliqueness of the parallelogram or rhomboid shape of the tire components 91,

92. Naturally, it only makes sense to set the cutting angle A at an oblique angle to the cutting line C and/or the longitudinal vertical plane YZ.

As shown in FIG. 1, the first conveyor 61 and the second conveyor 62 are arranged for conveying the transferred first tire components 91 and the transferred second tire components 92 in a first plane of conveyance D and a second plane of conveyance E, respectively, towards a downstream station, e.g. a stitching station, or a tire building drum (not shown). The planes of conveyance D, E are typically formed by endless belt conveyors. In this example, the first plane of conveyance D and the second plane of conveyance E are both horizontal or substantially horizontal. The conveyors 61, 62 extend mutually parallel to each other on opposite sides of the cutting station 2. The first transfer unit 71 is placed such that its range extends from the cutting station 2 to the first conveyor 61. The second transfer unit 72 is placed such that its range extends from the cutting station 2 to the second conveyor 62. The first transfer unit 71 comprises a first gripper 73 that is arranged for engaging the first tire component 91 during or directly after cutting by the cutting device 3, to prevent the first tire component 91 from falling off the cutting table 30. The first gripper 73 preferably a vacuum plate 74 with a shape or contour resembling the parallelogram or rhomboid shape of the cut-off first tire component 91, for reliably engaging and retaining the first tire component 91.

The first transfer unit 71 further comprises a first manipulator 75, in this example in the form of a robot able to rotate the first gripper 73 about three Cartesian axes, and/or to translate the first gripper 73 along said three Cartesian axes. Such a robot is known as a robot having six degrees of freedom (6DoF). The first manipulator 75 is arranged for reorienting or repositioning the first gripper 73 and the first tire component 91 engaged by said first gripper 73 in three dimensions. The first manipulator 75 is arranged for transferring each first tire component 91 from the cutting station 2 to the first conveyor 61. During the transfer, the first manipulator 75 repositions the first tire component 91 from a first orientation in which the main surface 94 of the first tire component 91 extends parallel to the support plane P to a second orientation in which the main surface 94 of the first tire component 91 extends parallel to the first plane of conveyance D.

Similarly, the second transfer unit 72 comprises a second gripper 76, in this example in the form of a vacuum plate 77, for engaging each second tire component 92 and a second manipulator 78, in this example in the form of a robot, for reorienting or repositioning the second gripper 76 and the second tire component 92 engaged by said second gripper 76 in three dimensions. The second gripper 76 and the second manipulator 78 are functionally similar, equivalent or identical to the first gripper 73 and the first manipulator 75, respectively. The cutting station 2 is arranged for alternatingly cutting off first tire components 91 and second tire components 92, wherein the first transfer unit 71 and the second transfer unit 72 are arranged for alternatingly engaging, retaining and transferring the first tire components 91 and the second tire components 92, respectively, to build up the first tire layer 95 at the first conveyor 61 and the second tire layer 96 at the second conveyor 62.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

The invention claimed is:

1. A tire building machine comprising a cutting station for cutting off a first tire component from a strip of rubber material, wherein the cutting station comprises a cutting device and a feeding device for feeding the strip of rubber material into the cutting device, wherein the cutting device comprises a cutting table for supporting the strip of rubber material in a support plane and a cutting element for cutting the strip of rubber material along a cutting line that extends parallel to the support plane, wherein the support plane extends at a support angle with respect to a first vertical plane in a range of five to thirty degrees and wherein the feeding device is arranged for feeding the strip of rubber material onto the cutting table in a downward feeding direction parallel to the support plane, wherein the first tire component has a main surface that directly after cutting extends parallel to the support plane, wherein the tire building machine is further provided with a first conveyor for conveying the first tire component from the cutting station towards a downstream station or a tire building drum in a first plane of conveyance different from the support plane, wherein the tire building machine comprises a first transfer unit for transferring the first tire component from the cutting station to the first conveyor while repositioning the first tire component from a first orientation to a second orientation, respectively, wherein the main surface of the first tire component in the first orientation extends parallel to the support plane and in the second orientation extends parallel to the first plane of conveyance, wherein the cutting station is arranged for alternatingly cutting off the first tire component and a second tire component from the strip of rubber material, wherein the second tire component has a main surface that directly after cutting extends parallel to the support plane, wherein the tire building machine is further provided with a second conveyor for conveying the second tire component from the cutting station towards a downstream station or a tire building drum in a second plane of conveyance different from the support plane, wherein the tire building machine comprises a second transfer unit for transferring the second tire component from the cutting station to the second conveyor while repositioning the second tire component from a third orientation to a fourth orientation, respectively, wherein the main surface of the second tire component in the third orientation extends parallel to the support plane and in the fourth orientation extends parallel to the second plane of conveyance.

2. The tire building machine according to claim 1, wherein the support angle is arranged to facilitate sliding of the strip of rubber material in the downward feeding direction over the cutting table at least partially under the influence of gravity.

3. The tire building machine according to claim 1, wherein the support angle is in a range of ten to twenty degrees with respect to the vertical plane.

4. The tire building machine according to claim 1, wherein the feeding direction extends parallel to a second vertical plane that extends perpendicular to the first vertical plane.

5. The tire building machine according to claim 4, wherein the cutting line extends obliquely with respect to the second vertical plane.

6. The tire building machine according to claim 5, wherein the feeding direction intersects with the cutting line.

7. The tire building machine according to claim 1, wherein the feeding device is arranged for feeding the strip of rubber material onto the cutting table into a cutting position in which the strip of rubber material extends beyond the cutting line in the downward feeding direction.

8. The tire building machine according to claim 1, wherein the feeding device during feeding does not intersect with the cutting line.

9. The tire building machine according to claim 1, wherein the cutting device comprises a cutting guide extending parallel to the cutting line, wherein the cutting element is movable along the cutting guide to cut the strip of rubber material at the cutting line, wherein the cutting guide is spaced apart along the cutting line from the cutting table by a feeding gap, wherein the feeding device is arranged for feeding the strip of rubber material in the feeding direction through the feeding gap.

10. The tire building machine according to claim 9, wherein the cutting line extends at a cutting angle, wherein the cutting guide is rotatable with respect to the feeding device about a rotational axis that extends orthogonal to the support plane to adjust the cutting angle.

11. The tire building machine according to claim 10, wherein the cutting table is rotatable about the rotational axis, wherein the cutting guide is operationally coupled to cutting table so as to be rotatable together with the cutting table about the rotational axis.

12. The tire building machine according to claim 11, wherein the cutting table has an at least partly circular outer edge extending concentrically to the axis of rotation.

13. The tire building machine according to claim 11, wherein the cutting station comprises a base for rotatable supporting the cutting table, wherein the cutting station is further provided with a rotational drive that is coupled to the cutting table to rotate the cutting table about the rotational axis with respect to the base.

14. The tire building machine according to claim 1, wherein the cutting element is a disc cutter, wherein the cutting table is provided with a cutting bar that cooperates with the disc cutter to cut the strip of rubber material at the cutting line.

15. The tire building machine according to claim 1, wherein the first plane of conveyance is horizontal.

16. The tire building machine according to claim 1, wherein the first transfer unit comprises a first gripper for engaging the first tire component at the support plane during or directly after cutting and for repositioning the first tire component from the first orientation into the second orientation.

17. The tire building machine according to claim 16, wherein the first transfer unit comprises a first manipulator, wherein the first manipulator is arranged for moving the first gripper from the first orientation into the second orientation.

18. The tire building machine according to claim 1, wherein the second plane of conveyance is horizontal.

19. The tire building machine according to claim 1, wherein the second transfer unit comprises a second gripper for engaging the second tire component at the support plane during or directly after cutting and for repositioning the second tire component from the third orientation into the fourth orientation.

20. The tire building machine according to claim 19, wherein the second transfer unit comprises a second manipulator, wherein the second manipulator is arranged for moving the second gripper from the third orientation into the fourth orientation.

21. A method for cutting off a first tire component from a strip of rubber material in a tire building machine according to claim 1, wherein the method comprises the step of feeding the strip of rubber material onto the cutting table in the downward feeding direction and allowing the strip of rubber material to slide in the downward feeding direction under the influence of gravity over the cutting table into a cutting position in which the strip of rubber material extends beyond the cutting line in the downward feeding direction.

22. The method according to claim 21, wherein the first tire component has a main surface that directly after cutting extends parallel to the support plane, wherein the tire building machine is further provided with a first conveyor for conveying the first tire component from the cutting station towards a downstream station or a tire building drum in a first plane of conveyance different from the support plane, wherein the method further comprises the step of transferring the first tire component from the cutting station to the first conveyor while repositioning the first tire component from a first orientation to a second orientation, respectively, wherein the main surface of the first tire component in the first orientation extends parallel to the support plane and in the second orientation extends parallel to the first plane of conveyance.

23. The method according to claim 22, wherein the first plane of conveyance is horizontal.

24. The method according to claim 22, wherein the cutting station is arranged for alternatingly cutting off the first tire component and a second tire component from the strip of rubber material, wherein the second tire component has a main surface that directly after cutting extends parallel to the support plane, wherein the tire building machine is further provided with a second conveyor for conveying the second tire component from the cutting station towards a downstream station or a tire building drum in a second plane of conveyance different from the support plane, wherein the method further comprises the step of transferring the second tire component from the cutting station to the second conveyor while repositioning the second tire component from a third orientation to a fourth orientation, respectively, wherein the main surface of the second tire component in the third orientation extends parallel to the support plane and in the fourth orientation extends parallel to the second plane of conveyance.

25. The method according to claim 24, wherein the second plane of conveyance is horizontal.

\* \* \* \* \*